US006857038B2

(12) United States Patent
Liu et al.

(10) Patent No.: US 6,857,038 B2
(45) Date of Patent: Feb. 15, 2005

(54) COMMON CONNECTOR FOR MEMORY CARDS AND SWITCHING ARBITRATION METHOD FOR SHARED PINS OF A CONNECTOR

(76) Inventors: Wen-Tsung Liu, Fifth Floor, No. 1, Lane 45, Pao-Hsing Road, Hsin-Tien, Taipei Hsien (TW), 231; Chia-Li Chen, Fifth Floor, No. 1, Lane 45, Pao-Hsing Road, Hsin-Tien, Taipei Hsien (TW), 231

(*) Notice: Subject to any disclaimer, the term of this patent is extended or adjusted under 35 U.S.C. 154(b) by 344 days.

(21) Appl. No.: 10/223,820

(22) Filed: Aug. 16, 2002

(65) Prior Publication Data

US 2003/0229746 A1 Dec. 11, 2003

(30) Foreign Application Priority Data

Jun. 7, 2002 (TW) .......................... 091112344

(51) Int. Cl.[7] .................. G06F 13/00; G06K 19/00
(52) U.S. Cl. .................. 710/301; 235/441; 361/737; 439/638
(58) Field of Search .................. 710/301, 302; 235/441; 439/638; 361/737, 683, 684, 748; 370/359, 360; 340/2.1; 365/58, 63

(56) References Cited

U.S. PATENT DOCUMENTS 5,596,569 A * 1/1997 Madonna et al. ........... 370/217
5,887,145 A * 3/1999 Harari et al. ............... 710/301
5,905,253 A * 5/1999 Ito et al. ..................... 235/486
6,663,007 B1 * 12/2003 Sun et al. .................... 235/487

OTHER PUBLICATIONS

"High-speed data transmission in a rack system with coaxial board connectors" by Mikazuki, T.; Yasuda, K.; Sugiura, N.; Oka, (abstract only) Publication Date: Jun. 1994.*

"ESD protective I/O serpentine block design" by Soohoo, K.M.; Wu, C.-Y. (abstract only) Publication Date: Aug. 12–16, 1991.*

* cited by examiner

Primary Examiner—Gopal C. Ray

(57) ABSTRACT

The present invention relates to a common connector for memory cards and a switching arbitration method for the shared Pins of the connector, i.e., a common connector which allows many different types of memory cards to be inserted in and fixed at different times. A multiple of rows/sets of different types of Pins are devised on one side of a baseboard of the common connector. And particularly, a set of shared Pins enables identification of interface signals from SD/MMC cards or SM cards. Under the control of corresponding memory card detection switches and switching arbitration circuits, the shared Pins can be connected to interface signals from a SD/MMC card or a SM card. Therefore, such a structure not only reduces the size of the common connector but also supports a multiple of types of memory cards.

5 Claims, 7 Drawing Sheets

COMMON CONNECTOR FOR MEMORY CARDS AND SWITCHING ARBITRATION METHOD FOR SHARED PINS OF A CONNECTOR

BACKGROUND OF THE INVENTION

1. Field of the Invention

The present invention relates to a common connector for memory cards, in particular to a common connector for memory cards and a switching arbitration method for the shared Pins of the connector.

2. Description of Related Art

Currently, portable memory devices mainly comprises of magnetic memory products, magnetic disks or optical disks utilizing optical storage technologies, and flash memory devices utilizing semiconductor storage technologies. In above 3 categories, flash memory products are the most popular in the industry, which are often called memory cards or mini-cards such as PCMCIA ATA Flash Card (PC card), CompactFlash Card (CF Card), Smart Media Card (SM Card), Multimedia Card (MMC), Memory Stick Card (MS Card), and Secure Digital Card (SD Card), etc. This type of flash memory cards is far better than the other types mentioned above in portability, power consumption, data storage, data transfer rate, rewriting, shockproof and moisture-proof features. By now, it has been widely used in consumer electronic products such as DSCs, DVRs, and PDAs as well as in new portable devices such as Smart Phones, Mobile PCs, Mobile Phones, MP3 Players, and GPS products.

Besides said benefits and price advantage of portable memory devices, the main influential factor that effect the market is the acceptance of consumers, i.e., the sizes of connectors and the connection ability between memory cards and connectors have great influence on the popularization of the products in the market. In fact, portable memory devices are originally used in computer systems (desktop or notebook) or in consumer electronic products such as DSCs and PDAs. However, in order to comply with standards of different types of memory cards in the current market, and to connect usual computer systems and other connectors, connectors supporting a single memory card are already available, and even those supporting a multiple of different types of memory cards have appeared.

Particularly, the connectors supporting a multiple of different types of memory cards, sets of Pins for specific memory cards are devised in sequence on the top board and the bottom board, and the sets of Pins are welded respectively according to supported interface jack and memory cards can only be inserted and fixed in the direction of the Pins are devised. Therefore, card detection switches to detect the features of memory card inserted and write protection switches have to be devised near the insertion end, which will enlarge the size of the connector. However, large connectors are not suitable for the trend of 'light in weight', 'thin in thickness', and 'small in size', which is the main factor of the portable memory devices being introduced into the market.

Moreover, because that corresponding and exclusive Pins are used in traditional connectors and only detection and arbitration for single interface signal are required, the circuit and control unit of traditional connectors are relatively simple. In other words, the insufficiency in flexibility in such a connector is not a vital problem. Also, in such a design, due to the configuration of Pins, card detection switches, and write protection switches, the size/volume of the connector supporting a multiple of types of memory cards is relatively large.

SUMMARY OF THE INVENTION

To solve above problems and attain additional efficacies and purposes, the inventor invents a common connector supporting a multiple of types of memory cards, which meets the requirements for light, thin, short, and small memory cards in today's market. Such a common connector not only supports the increasingly demand for portable memory devices, but also facilitates the popularization of those products in the consumer electronics market.

In the common connector of according to the invention, in order to support various types of memory cards and special standards, shared Pins detecting and identifying more than one type of memory cards are used. Furthermore, in consideration that the intervals between adjacent rows of Pins for SM cards and SD/MMC cards are similar, one row/set of Pins of SM cards in the connector are properly adjusted horizontally and vertically to support SD/MMC cards. Such a design not only simplifies the mechanical structure but also reduces the size of the connector.

Further, because that SM cards and SD/MMC cards share the same Pins, additional circuits and control are required to detect and identify the memory cards inserted, and then correct selection and switching can be performed. According to the invention, two switching arbitration circuits are deployed to detect when a SM card or a SM/MMC card is inserted in and then switch to the correct signals. Another feature and purpose of the invention is to connect the shared Pins to the correct jacks of a memory card and interrupt the incorrect part.

Besides supporting and identifying SM cards and SD/MMC cards, the invention supports insertion of a MS card. Therefore, a common connector not only meets the requirements for lightness, thinness, shortness, smallness in today's market, but also supports a multiple of types of memory cards. It is significantly different to traditional connectors supporting only one type of memory cards and simplifies the mechanical structure and the production process. That is another purpose of the present invention.

The structure and efficacy of the invention is further described in detail in the following embodiments and descriptions.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE PREFERRED EMBODIMENT

According to the present invention, in consideration that the intervals between adjacent rows of Pins for SM and SD/MMC cards are similar, one row of Pins for SM cards is shared with SD/MMC cards, and deploys appropriate circuits and elements to detect and identify the memory card inserted in the common connector, and therefore, arbitration and switching activities is performed. Therefore, such a device eliminates the exclusive Pins for a SD/MMC card in traditional connectors.

Figure 1:
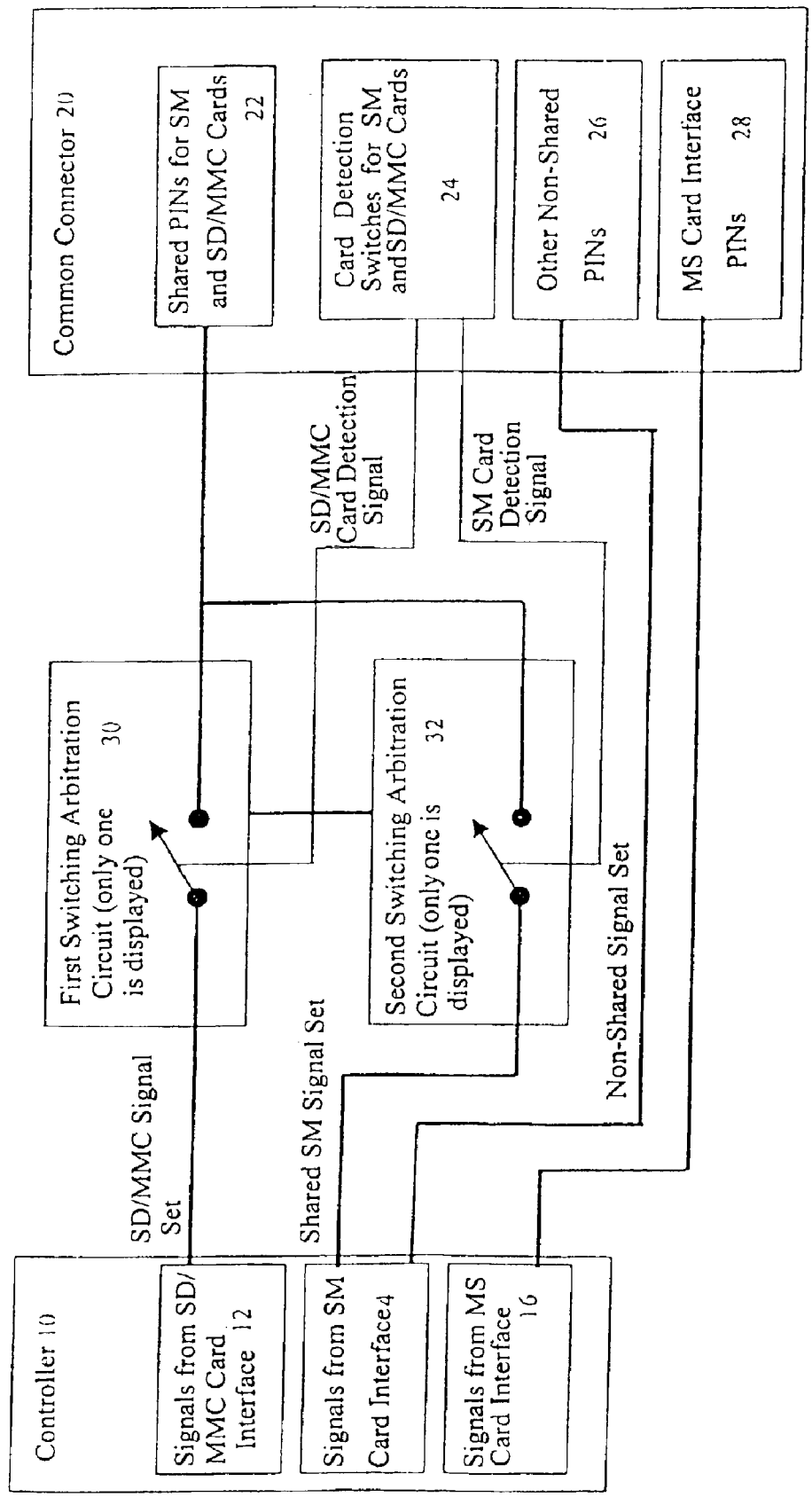
FIG. 1 is a block diagram of the card detection and circuit switching arbitration part of an embodiment of the memory cards inserted implemented according to the present invention.
Figure 2:
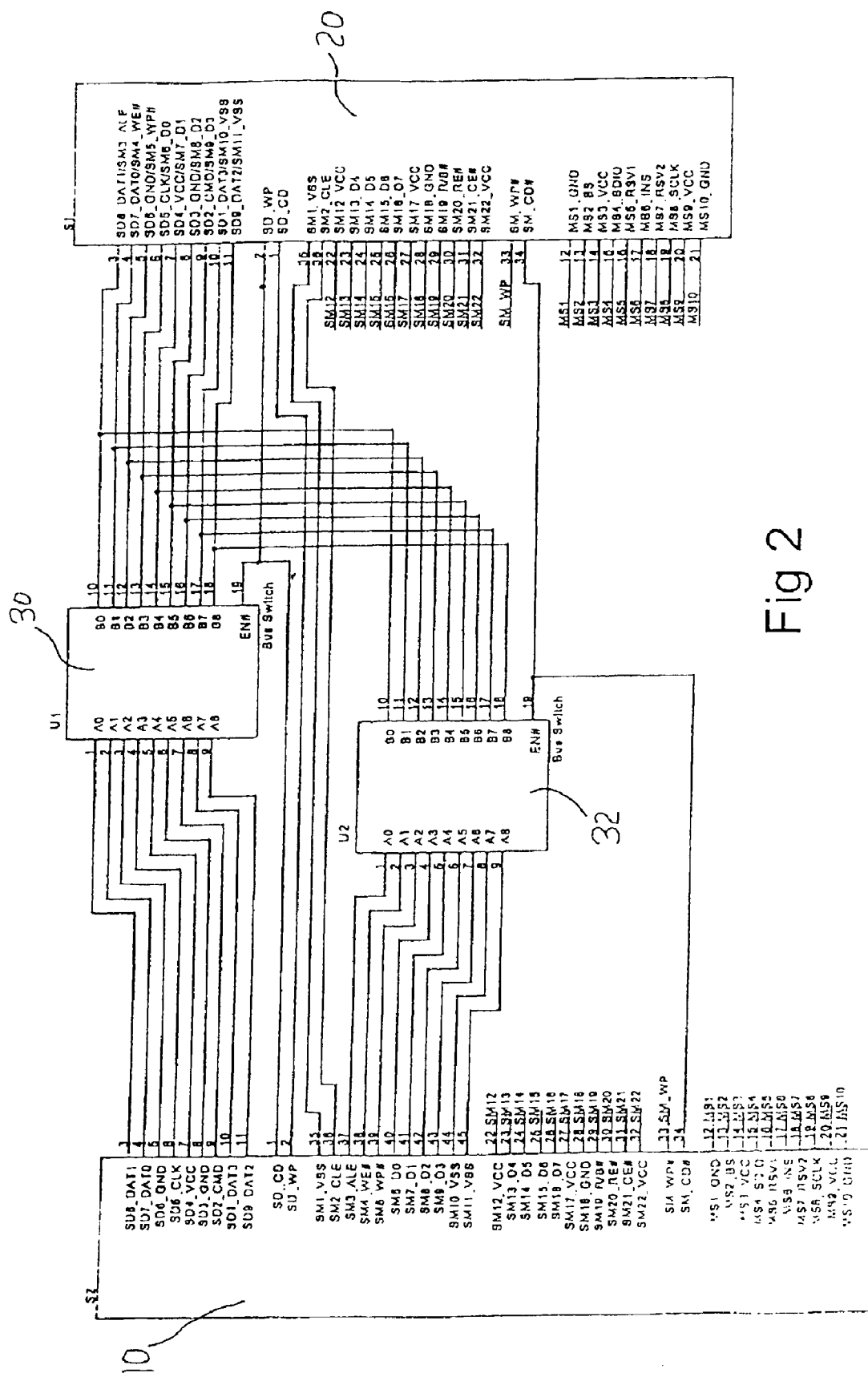
FIG. 2 is a circuit diagram of the embodiment shown in FIG. 1.
Figure 4:
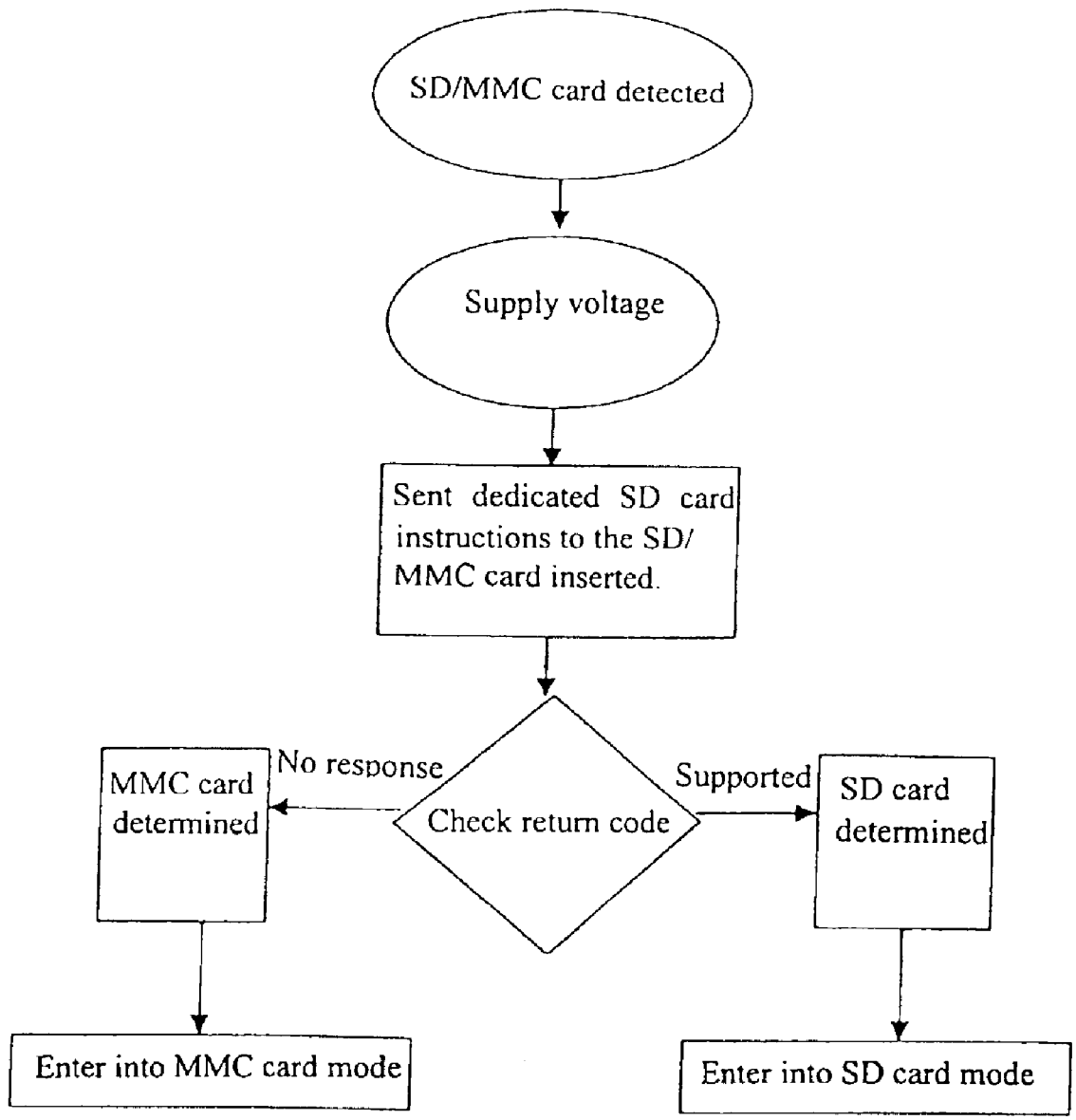
FIG. 4 is an identification flowchart for a SD card and a MMC card as shown in FIG. 3.

Referring to FIG. 1 and FIG. 2, which are the block diagram and the circuit diagram of the card detection and circuit switching arbitration part of an embodiment of the memory cards inserted according to the present invention. The present invention, a common memory card connector and a switching arbitration method for the shared Pins of that connector, deploys a baseboard 40 of the common connector 20 which supports insertion of a multiple of types of memory cards at different times. There are 3 rows/sets of different types of Pins on the baseboard (shown in FIG. 4–FIG. 6). Card detection switches are deployed at appropriate positions where the memory cards are inserted. And the switches are to detect signals from the memory cards. The common connector comprises: a set of shared Pins 22, i.e., the first row of Pins (from the insertion end of the memory card) on the baseboard of the common connector 20, which is among the different types of Pins; a controller 10 comprising of I/O elements to control and support signals from a SD/MMC card interface 12 and a SM card interface 14; the first switching arbitration circuit 30 coupled between the controller 10 and the common connector 20 to switch a SD/MMC card 46 and its interface signals 12; and The second switching arbitration circuit 32 coupled between the controller 10 and the common connector 20 to switch a SM card 42 and its interface signals 14.

When the jacks of a SD/MMC card 46 or a SM card 42 contact the Pins 22, the corresponding memory card detection switches 24 will switch the circuit to the correct SD/MMC card interface signals 12 or SM card interface signals 14 under the control of the first switching arbitration circuit 30 or the second switching arbitration circuit 32. In other words, through the close loop of the switching arbitration circuit 30, 32, the controller 10 can control the I/O of data from the memory cards inserted in the common connector 20 and in the mean time interrupt the connection to unused Pins (e.g., the other row of Pins for SM card or the Pins for MS card), as well as connect to non-shared Pins 26 or Pins 28 for MS card interface.

In order to ensure that a row of Pins (i.e., the first row of Pins on the common connector according to the invention) can be shared with a SD/MMC card 46 and a SM card 42, and in consideration that there are 9 contact locations for a SD/MMC card 46, the number of the shared Pins (with the SM card 42) should also be 9. To ensure that the controller 10 controls the correct locations of the SM card 42 or the SD/MMC card 46, two sets of switching arbitration switches 32 and 30 are devised and each set comprises of 9. When the card detection switch 24 detects the insertion of a SM card 42 or a SD/MMC card 46, the two sets of switches 32 and 30 will be activated to connect the set of shared Pins 22 to the correct locations (signals from a SD/MMC card interface or a SM card interface); while the inactivated switch 32 and 30 will isolate unused locations.

Also referring to FIG. 2 and Table 1, apparently, the PIN 1, PIN 10, and PIN 11 of a SM card are similar. PIN 1 and PIN 10 are mainly designed to detect grounding signals. Therefore, PIN 1 and PIN 2 are separated from remainder ones, and PIN 3–PIN 11 serve as Pins shared with a SD/MMC card.

TABLE 1

| Shared Pins | | | | | |
|---|---|---|---|---|---|
| SM Card | | | SD/MMC Card | | |
| No. | Name of pins | Function Description | No. | Name of Pins | Function Description |
| 3 | ALE | Address Latch Enable | 8 | D1 | Data Line [Bit 1] |
| 4 | WE | Write Enable | 7 | D0 | Data Line [Bit 0] |
| 5 | WP | Write Protect | 3 | VSS | Ground |
| 6 | D0 | Data 0 | 5 | CLK | Clock |
| 7 | D1 | Data 1 | 4 | VDD | Supply Voltage |
| 8 | D2 | Data 2 | 6 | VSS | Ground |
| 9 | D3 | Data 3 | 2 | CMD | Common/Response |
| 10 | GND | Ground | 1 | D3 | Data Line [Bit 3] |
| 11 | CD | Card Detect | 9 | D2 | Data Line [Bit 2] |

Figure 3:
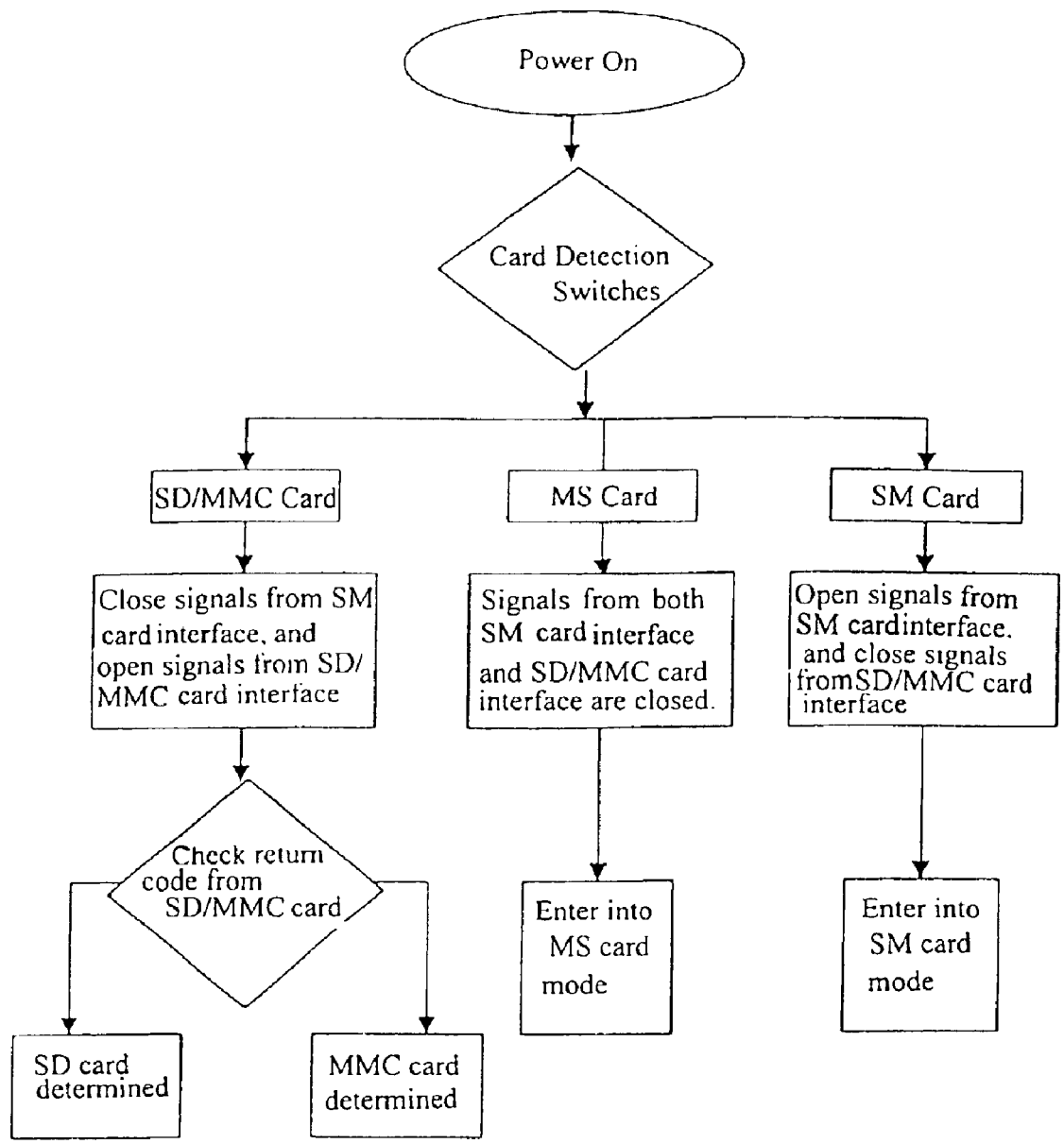
FIG. 3 is an arbitration flow chart of the common connector supporting four different types of memory cards according to the present invention.

Also referring to FIG. 3, which is the arbitration flowchart for a common connector supporting 4 different types of memory cards according to the present invention. When power on, the device will identify whether the card is a SD/MMC, a MS or a SM card according to the card detection switches, and then switch to the corresponding Pins. Please pay attention to the shared Pins between a SD/MMC card and a SM card. When a SD/MMC card is detected, the circuit will interrupt the signals from the SM card and be switched to the signals from the SD/MMC interface; while a SM card is detected, the circuit will interrupt the signals from the SD/MMC card and be switched to the signals from the SM card. However, when a MS card is inserted, the circuit will interrupt the signals from both SM and SD/MMC cards and be switched to the signals from the MS interface (not shown).

Because SD cards and MMC cards are similar in size and only 2 Pins for them are different, usually the two types of cards are regarded as the same type, and only a little adjustment in circuit is required. Also referring to FIG. 4, which is an identification flowchart for a SD card and a MMC card as shown in FIG. 3. When a SD/MMC card is detected, relevant elements will be activated to supply voltage, and exclusive instructions are selected and sent to the inserted SD or MMC card. Then if there is response, it means a SD card is inserted and the connector will go into SD card mode. On the contrary, if there is no response, it means a MMC card is inserted and the connector will go into MMC card mode.

Figure 5:
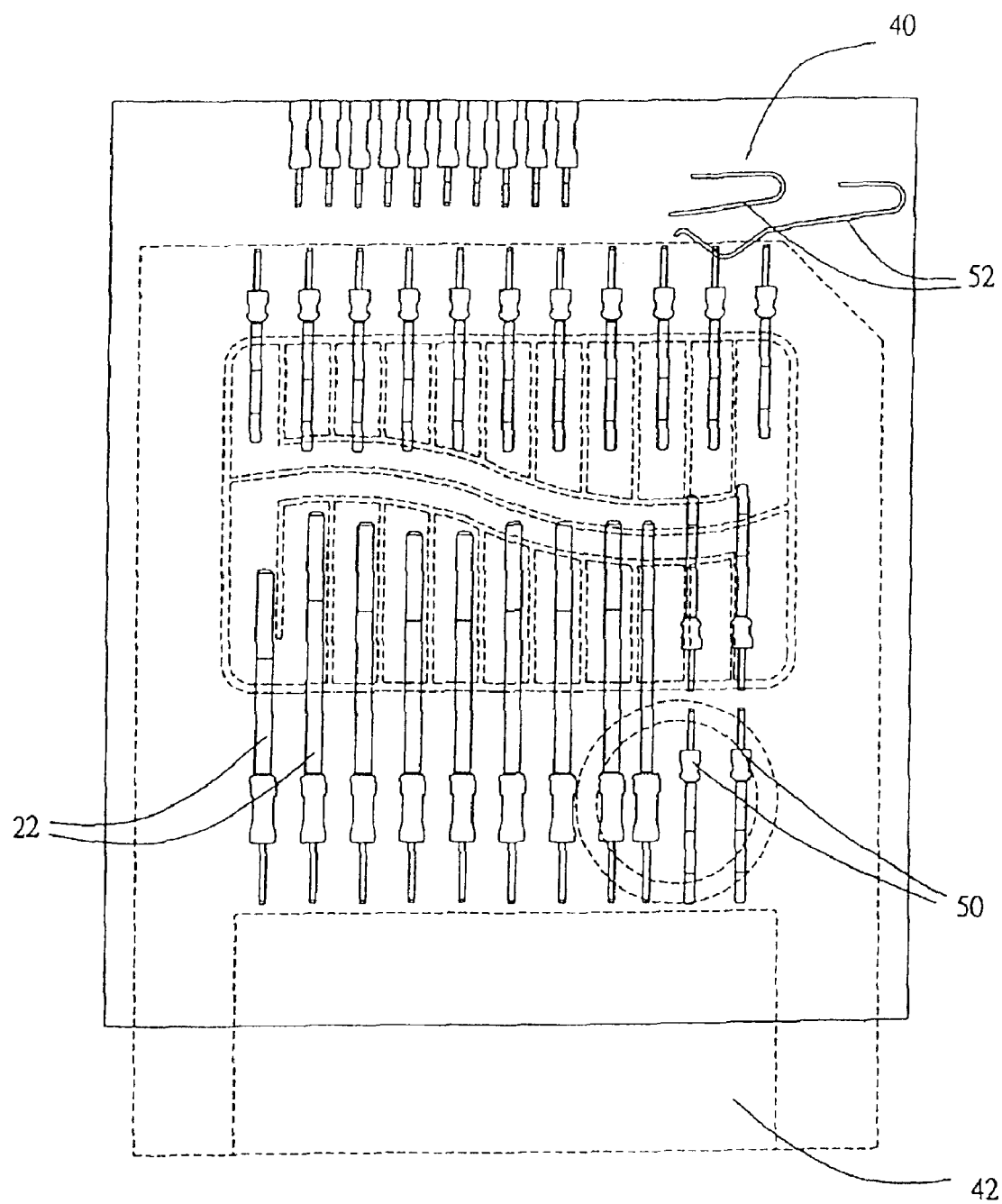
FIG. 5 is a plan view of the common connector with an inserted SM card according to the present invention.
Figure 6:
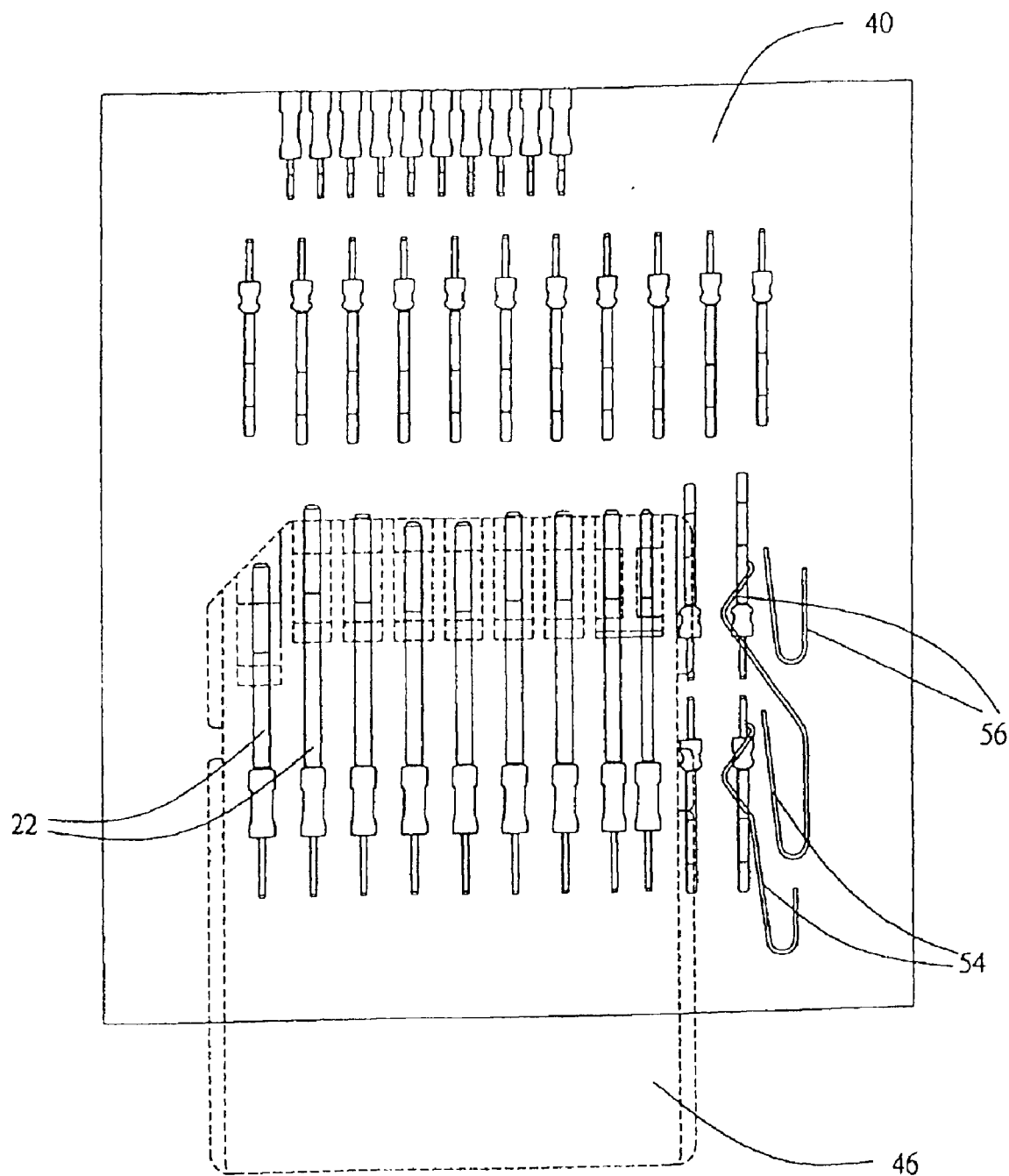
FIG. 6 is a plan view of the common connector with an inserted SD/MMC card according to the present invention.
Figure 7:
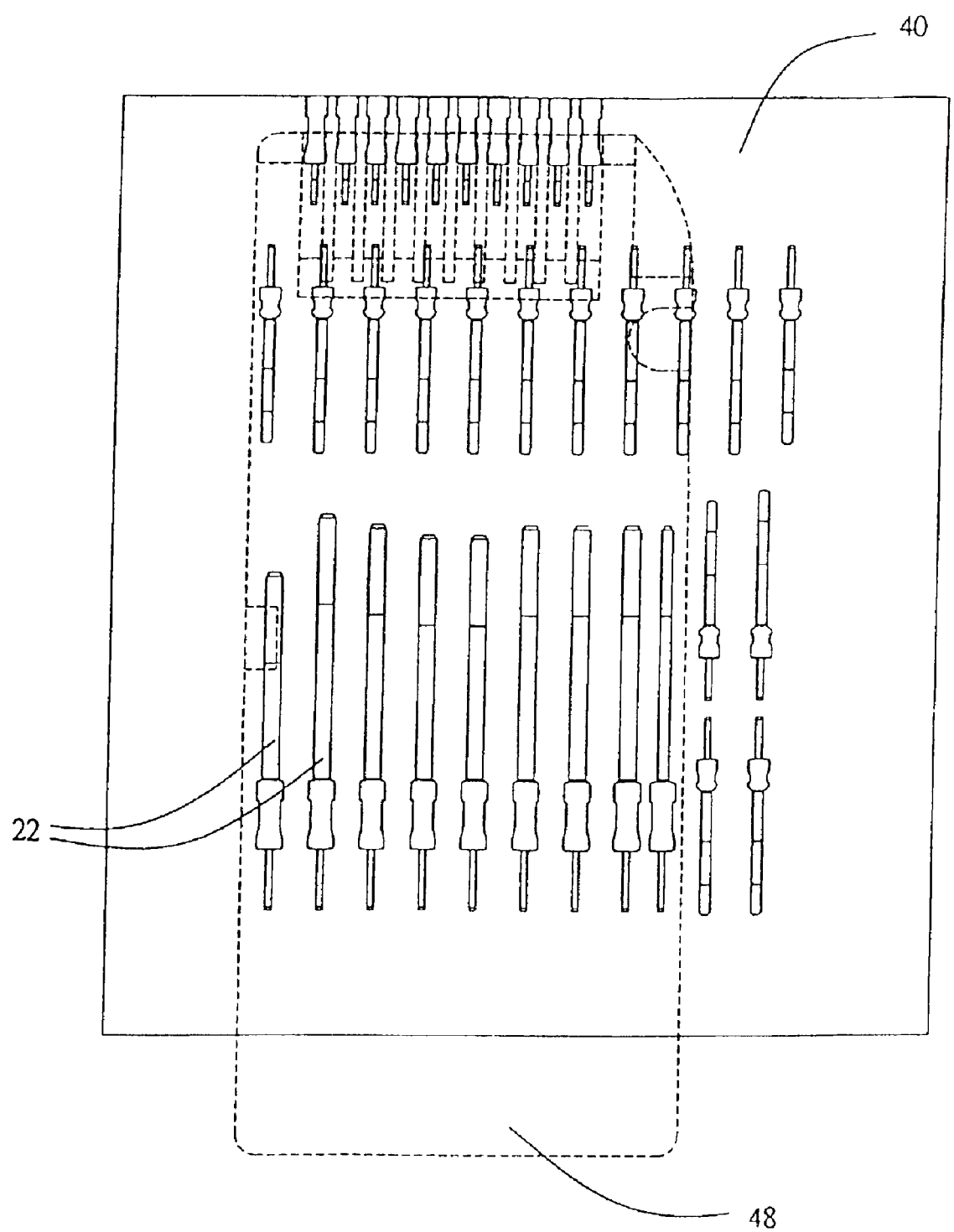
FIG. 7 is plan view of the common connector with an inserted MS card according to the present invention.

Also referring to FIG. 5, FIG. 6 and FIG. 7, which are 3D views of the connector when a SM, SD/MMC, or MS card is inserted in. The figures show that the common connector 20 according to the present invention has a multiple of different types of Pins (3 sets in all) on the single baseboard 40. Particularly, besides the set of Pins 22 shared by the SD/MMC card 46 and the SM card 42, the invention contains another set of Pins 28 (shown in FIG. 7) for a MS card interface. Therefore, the invention supports 4 types of memory cards comprising of SM, SD/MMC and MS cards.

And as shown in FIG. 5 and FIG. 6, the card detection switches according to the invention comprise of two sets of switches 52, 56 and two sets of write protection switches 50, 54. For SM cards 42, a switch 52 is mounted on the front of the insertion end; for SD/MMC cards 46, a switch 56 is mounted at one side of the insertion end. When the switches 52 for SM and SD/MMC cards 56 detect no signal, it indicates that a MS card is inserted for the moment. however, on the same and right side of the shared set of Pins 22 a set of write protection switches 50 for SM card is mounted; and at the lower part of the card detection switch 56 for SD/MMC card a set of write protection switches 54 for SD/MMC card is mounted. All above switches are made of conductive leaf springs, the principle and composition are known and will not be discussed here.

In conclusion, common connector for memory card and the switching arbitration method for the shared Pins of that connector according to the present invention has the following benefits:

1. According to the invention, 3 rows/sets of different types of Pins are embedded on a single baseboard of the common connector to enable insertion, detection, and identification for more than one type of memory cards. Furthermore, one set of the Pins serves as shared Pins. Therefore, this device not only simplifies production procedures and mechanical structure of traditional common connectors, but also reduces the size of such a common connector greatly.

2. The invention deploys two switching arbitration circuits, each of which is coupled between the common connector and a controller. When a SM card or a SD/MMC card is inserted in the common connector, different signals will be generated and the corresponding switching arbitration circuit will switch the shared Pins to the correct signals.

3. Besides supporting and identifying SM cards and SD/MMC cards, the invention also supports insertion of a MS card. Such a common connector not only meets the requirements for light, thin, short, small, which are a trend in today's market, but also supports a multiple of types of memory cards.

While the invention has been described with referencing to the preferred embodiment thereof, it is to be understood that modifications or variations may be easily made without departing from the spirit of this invention, which is defined by the appended claims.

What is claimed is:

1. A common connector for memory cards and switching arbitration method for the shared Pins of the connector, i.e., a common connector which allows many different types of memory cards to be inserted in and fixed at different times, wherein, a plurality of rows/sets of different types of Pins and card detection switches are devised on one side of a single baseboard of the common connector to detect the memory cards inserted; the common connector comprising a row/set of shared Pins, being among the different types of pins;

a controller, further comprising of I/O elements to control and support signals from a SD/MMC card interface and a SM card interface;

a first switching arbitration circuit, being coupled between the controller and the common connector to switch a SD/MMC card and its interface signals; and a second switching arbitration circuit, being coupled between the controller and the common connector to switch a SM card and its interface signals;

whereby, When the jacks of a SD/MMC card or a SM card contact the Pins, the corresponding memory card detection switches will switch the circuit to the correct SD/MMC card interface signals or SM card interface signals under the control of the first switching arbitration circuit or the second switching arbitration circuit.

2. The common connector for memory cards and switching arbitration method for the shared Pins of the connector as recited in claim 1, wherein the shared Pins serve as a means to detect signals from a SM card or a SD/MMC card and interrupt other shared Pins unused at the same time.

3. The common connector for memory cards and the switching arbitration method as recited in claim 1, wherein the set of different types of Pins also include a set for a MS card.

4. The common connector for memory cards and the switching arbitration method as recited in claim 1, wherein the card detection switches include one for a SM card and another for a SD/MMC card.

5. The common connector for memory cards and the switching arbitration method as recited in claim 1, wherein the common connector supports SM, SD/MMC, and MS cards.

* * * * *